US008407325B2

(12) United States Patent
Gusler et al.

(10) Patent No.: US 8,407,325 B2
(45) Date of Patent: Mar. 26, 2013

(54) METHOD AND SYSTEM FOR AUTOMATED PROJECT ACCOUNTABILITY

(75) Inventors: Carl P. Gusler, Austin, TX (US); Rick A. Hamilton, II, Charlottesville, VA (US); Peter S. Weatherby, Denver, CO (US)

(73) Assignee: International Business Machines Corporation, Armonk, NY (US)

( * ) Notice: Subject to any disclaimer, the term of this patent is extended or adjusted under 35 U.S.C. 154(b) by 3142 days.

(21) Appl. No.: 09/935,396

(22) Filed: Aug. 23, 2001

(65) Prior Publication Data

US 2003/0055660 A1      Mar. 20, 2003

(51) Int. Cl.
*G06F 15/173* (2006.01)
(52) U.S. Cl. ......... 709/223; 709/203; 709/217; 709/224
(58) Field of Classification Search .................. 709/203, 709/217; 705/7, 8, 9; 707/10, 104.1, 500
See application file for complete search history.

(56) References Cited

U.S. PATENT DOCUMENTS

| | | | | |
|---|---|---|---|---|
| 4,875,162 A * | 10/1989 | Ferriter et al. | ................... | 705/29 |
| 5,499,357 A | 3/1996 | Sonty et al. | | |
| 5,826,252 A * | 10/1998 | Wolters et al. | .................... | 707/1 |
| 6,009,256 A | 12/1999 | Tseng et al. | | |
| 6,151,608 A | 11/2000 | Abrams | | |
| 6,308,164 B1 * | 10/2001 | Nummelin et al. | ................ | 705/9 |
| 6,381,610 B1 * | 4/2002 | Gundewar et al. | ......... | 707/104.1 |
| 6,397,202 B1 * | 5/2002 | Higgins et al. | ................... | 706/47 |
| 6,581,040 B1 * | 6/2003 | Wright et al. | ...................... | 705/8 |
| 6,675,149 B1 * | 1/2004 | Ruffin et al. | ...................... | 705/8 |
| 6,687,677 B1 * | 2/2004 | Barnard et al. | ................... | 705/7 |
| 6,714,915 B1 * | 3/2004 | Barnard et al. | ................... | 705/7 |
| 6,738,746 B1 * | 5/2004 | Barnard et al. | ................... | 705/7 |
| 6,889,196 B1 * | 5/2005 | Clark | ................ | 705/9 |
| 6,901,372 B1 * | 5/2005 | Helzerman | ...................... | 705/7 |
| 2001/0032105 A1 * | 10/2001 | Frye et al. | ...................... | 705/7 |
| 2002/0059512 A1 * | 5/2002 | Desjardins | ...................... | 713/1 |
| 2003/0004763 A1 * | 1/2003 | LaBlanc et al. | ................... | 705/7 |
| 2003/0004766 A1 * | 1/2003 | Sandoval et al. | ................. | 705/7 |
| 2003/0212583 A1 * | 11/2003 | Perras et al. | ...................... | 705/7 |
| 2004/0148190 A1 * | 7/2004 | Barnard et al. | ................... | 705/1 |
| 2007/0288292 A1 * | 12/2007 | Gauger | ............................. | 705/9 |

\* cited by examiner

*Primary Examiner* — Lashonda Jacobs
(74) *Attorney, Agent, or Firm* — Mark Vallone; Robert C. Rolnik

(57) ABSTRACT

The invention provides a method for automated project accountability comprising, determining at least one decision maker of a project preparation, determining a readiness category for the decision maker, and providing a readiness category rating for the readiness category. The method further determines a decision process for the readiness category and readiness category rating, conducts a project assessment as a function of the decision process, and determines a project readiness as a function of the project assessments.

15 Claims, 3 Drawing Sheets

METHOD AND SYSTEM FOR AUTOMATED PROJECT ACCOUNTABILITY

FIELD OF THE INVENTION

In general, the invention relates to the modification of any existing business unit. More specifically, the invention relates to metrics for the business unit modification and in particular, to a method and system for associating the metrics to pertinent individuals.

BACKGROUND OF THE INVENTION

Project management is a key element to the successful completion of any project. There are very few aspects or principals of project management that differ, whether the project happens to be a civil engineering task such as improving a road or bridge, or a communications project involving software and hardware migration. Establishing plans, milestones, estimates of resources and schedules, and then monitoring progress against the plan, taking remedial action where necessary, apply equally to projects in any business discipline.

Multi-project business environments typically generate multiple priorities for project resources and managers alike, and can make focusing on individual problems difficult for the assigned manager to achieve. Driven by ever changing opportunities, multi-project organizations tend to launch projects as soon as they are understood, but without sufficient regard to the capacity of the organization. In order to alleviate this problem, multi-tasking of projects is typically used. Multi-tasking of projects allows individual managers to be assigned to multiple tasks, often differing from their specialized discipline, in order to reduce the number of personnel resources the projects requires. A common result is that the responsibility for sorting out an array of conflicting priorities and problems falls to inappropriate department managers, often unsuited to provide adequate solutions and frequently after the project has begun. If an individual is selected for a specific task they are unfamiliar with, or of which is not associated with the individuals department, the overall success and quality of the completed project may be jeopardized.

The practices of early project starts and multitasking have become recognized as common practice in many organizations, and have been incorporated into project management software tools. The software tools typically default to "ASAP" scheduling, and offer multitasking features associated with the scheduling of the project, but not the personnel. This can lead to project decisions being made "ready or not", and further enhance the possibility of associating incorrect individuals with project responsibilities.

Thus, there is a significant need for a method and system for improving project management techniques and software that overcome the above disadvantages and shortcomings, as well as other disadvantages.

SUMMARY OF THE INVENTION

One aspect of the invention provides a method for automated project accountability comprising, determining at least one decision maker of a project preparation, determining a readiness category for the decision maker, and providing a readiness category rating for the readiness category. The method further determines a decision process for the readiness category and readiness category rating, conducts a project assessment as a function of the decision process, and determines a project readiness as a function of the project assessments.

Another aspect of the invention provides a system for automated project accountability comprising a means for determining at least one decision maker of a project preparation, a means for determining a readiness category for the decision maker, and a means for providing a readiness category rating for the readiness category. Additionally, the system comprises a means for determining a decision process for the readiness category and readiness category rating, a means for conducting a project assessment as a function of the decision process, and a means for determining a project readiness as a function of the project assessments.

Another aspect of the invention provides a computer readable medium storing a computer program comprising computer readable code for determining at least one decision maker of a project preparation, computer readable code for determining a readiness category for the decision maker, and computer readable code for providing a readiness category rating for the readiness category. Additionally, the computer readable medium comprises computer readable code for determining a decision process for the readiness category and readiness category rating, computer readable code for conducting a project assessment as a function of the decision process, and computer readable code for determining a project readiness as a function of the project assessments.

The foregoing and other features and advantages of the invention will become further apparent from the following detailed description of the presently preferred embodiment, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENTS

Figure 1:
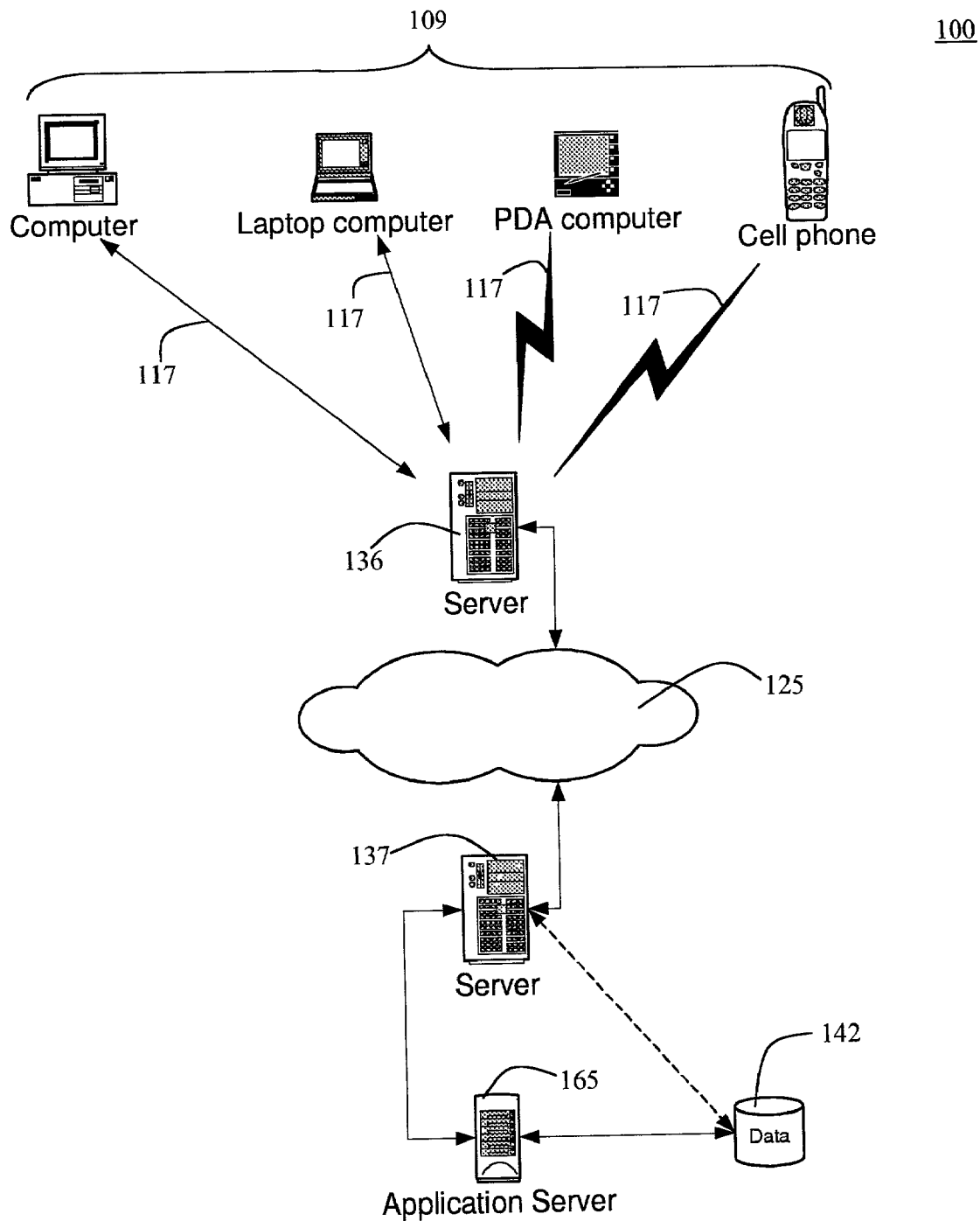
FIG. 1 is a block diagram illustrating a preferred embodiment of a network-based system in accordance with the present invention.

In FIG. 1, a network-based system 100 is illustrated in accordance with one embodiment of the present invention. As shown in FIG. 1, the network-based system 100 may contain communications devices 109, which may include network workstations, mainframe slave stations, personal computers, laptop computers, PDA (Personal Digital Assistant) computers, cell phones, and any other device used for network communications. The communications devices 109 may be in communication with a network server 136 or 137 through a wire or wireless network link (networks or systems) 117 that may include telephone or televisions systems, integrated services digital network (ISDN) systems, coaxial lines, computer networks, digital end user lines, private networks, wireless local loop systems, etc. The network server 136 of the network-based system 100 may be in communication with, but not limited to intranets, extranets, a local area network, a wide area network, and a telephone network (e.g., a public switched telephone network (PSTN), private telephone networks, etc.). In another embodiment of the invention, the network server 136 may communicate 125 with additional network servers 137 through a cellular network, satellite networks, a personal communication system, a TV network (e.g., a cable TV system), local, regional, national or global paging networks, and a wireless data network (e.g., satellite data or local wireless data networks). Further, the network server 136 communications 125 may include an e-mail system, a wireless LAN, a wireless local loop/distribution system, (e.g., LMDS. MMDS or Code Division Multiple Access (CDMA) based systems), a Voice-Over Internet Protocol (VOIP) network, the Internet, or any other similar on-line service. The network server 137 may include, or be in communication with an application server 165, hosting one embodiment of the invention. Additionally, the network server 137 may include or be in communication with a data storage device (database) 142. It will be recognized that the network-based system 100 may have all or part of the before mentioned components, may have portions in common, may comprise one or more networks, may comprise one or more topographies, and may comprise alternative connectivity as is known in the art.

In one embodiment of the network-based system 100, a communications device 109 may contact the application server 165, or any alternative network device suitable for network applications, through the before mentioned means and request the activation of a project management (PMA) or like application. Upon activation of the PMA, one embodiment of the invention may provide a team collaborative environment such as Lotus Notes, Microsoft Outlook, Netscape Netmeeting, Internet chat rooms, bulletin boards, e-mail, teleconferences, or like discussion environment. The active participants for the collaborative environment may begin with at least one member. For one embodiment of the invention, a project creator (such as an executive or the project manager) may begin as the only collaborative environment participant within the PMA. Communicating with the network-based system 100 through the communications device 109, the project creator may assess the preparation or prerequisites of the project prior to its implementation. By defining, validating, and providing accountability to the parameters of a proposed project preparation or prerequisites, the risk of organizational and work disruption can be minimized. The project creator may provide for a projects preparation (project readiness) as illustrated in FIG. 2, with a method for automated project accountability in accordance with the present invention.

Figure 2:
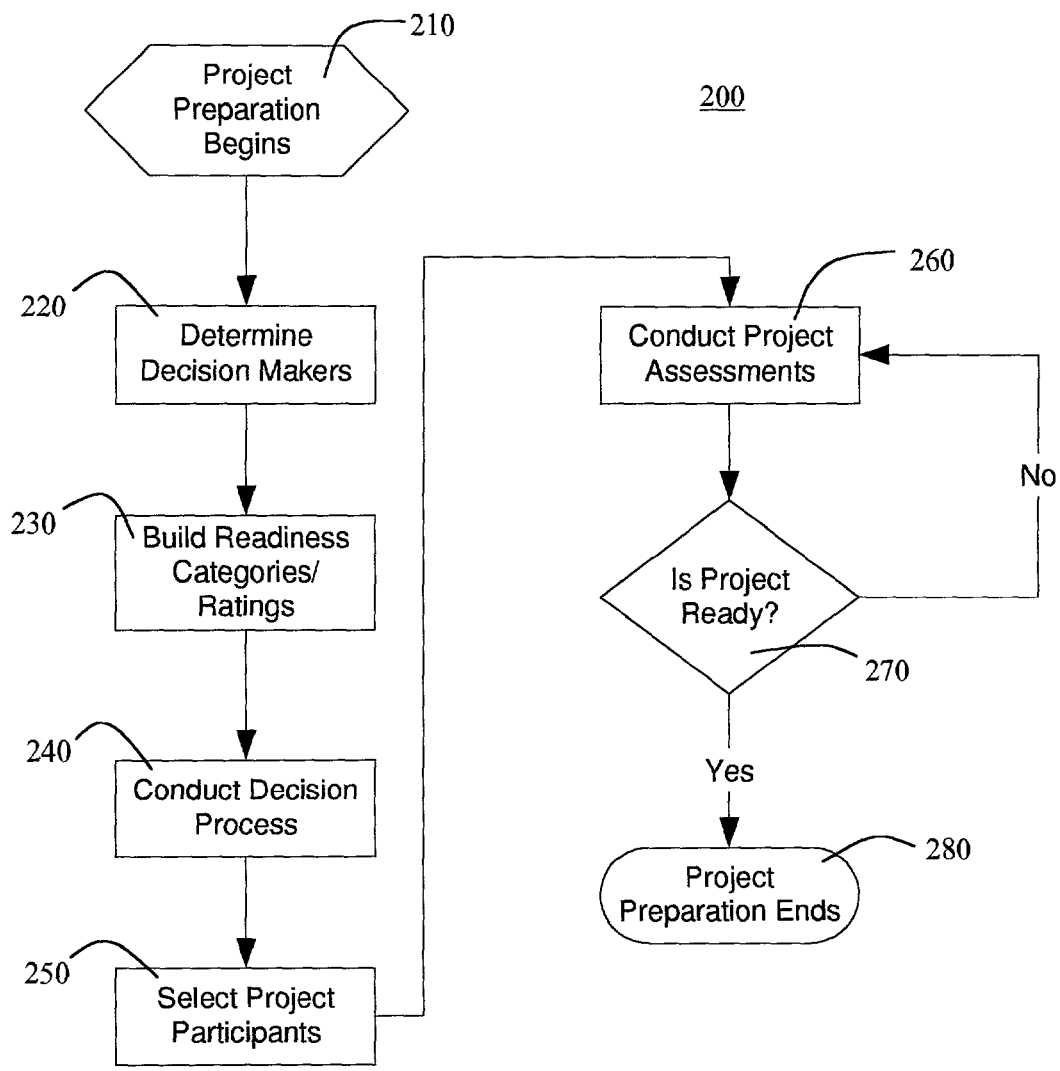
FIG. 2 is a flowchart representation of one embodiment of an automated project accountability method for the system of FIG. 1, in accordance with the present invention.

Within FIG. 2 is a flowchart representation of one embodiment of a project preparation process 200 as described for the network-based system 100. The embodiment of the invention shown in FIG. 2 utilizes a network application, which may be the PMA, in operation on the application server 165. The project creator may begin the project preparation 210 by activating a button, command, icon or alternative form of program activation known in the art, within the PMA. Upon activation, the project preparation process 200 may require the determination of who the decision makers 220 for the project will be. The decision makers may include a project decision maker, a contributing decision maker, and a participant decision maker. For one embodiment of the invention, the project decision maker may be the project creator, or an alternative individual may be assigned by the project creator as chosen from a list of people, staff, and managers whose information may be stored in the database 142. At least one contributing decision maker may be assigned to at least one application that is required for the projects preparation process, or for its implementation. Participant decision makers may be assigned as responsible for individual tasks within an application. The contributing decision makers and the participant decision makers may also be selected from the list of people, staff, and managers whose information may be stored in the database 142.

With the decision makers assigned, one embodiment of the invention may provide the project preparation process 200 with a collaboration mechanism. The collaborative mechanism may be invoked between the project decision maker, the contributing decision makers, and the participant decision makers to review the tentative readiness of categories, make suggestions, discuss, argue, and persuade. The collaborative mechanism could be an electronic forum (for discussion over long period of time,) or could be a "chat" or instant messaging technology (for focused, short period "real time" discussion.) Within one embodiment of the invention, the project decision maker may serve as moderator and provide any final decisions. The collaborative mechanism may be used to build readiness categories as well as provide rating levels for each application and task 230.

In one embodiment of the invention, the project decision maker may select, edit, create and approve the various readiness categories after the collaborative building of the readiness categories with their rating levels. When completed, a button, command, or icon within the PMA may be activated to provide an authentication and certification mechanism to record, confirm, and acknowledge finalization of the readiness categories and associated ratings.

The project decision maker next designates a decision process 240 by assigning "vote weighting" to each contributing and participant decision maker. The decision process may include such options as unanimous, simple majority, percentage majority (such as two thirds required,) points system, super-voter (where certain key individuals must vote yes to proceed,) and other options and rules. When completed, a button, command, or icon within the PMA may be activated to provide an authentication and certification mechanism to record, confirm, and acknowledge finalization.

An additional embodiment of the invention may allow the project decision maker to assign one or more readiness categories to each contributing decision maker. Again, a button, command, or icon within the PMA may be selected which may result in the various contributing decision makers' receiving notification of their delegated categories. With the readiness categories and decision weights assigned, the appearance and behavior of each decision maker's PMA may change appropriately. Throughout the project preparation process 200, one embodiment of the invention allows for any senior member of the decision makers to provide additional authority to another decision maker of equal or lesser stature. For example, a project decision maker may assign specified tasks he may normally perform to a contributing decision maker, a contributing decision maker may assign tasks he may normally perform to a participant decision maker, and so forth. Therefore, at any point in the detailed description that refers to a specified decision maker, an alternative decision maker may be assigned and given the advanced rights required.

The contributing decision makers may next select any additional project participants 250 required to complete the readiness assignments. For one embodiment of the invention, a list of people, staff, or managers may be presented by the PMA to the contributing decision makers, for each to make multiple selections from the list. (All lists of people, staff, or managers may also be extracted from the collaborative software's address book of all staff, of management team, of MIS staff, etc.) Again, a button, command, or icon within the PMA may be selected to signify the completion of selected participants.

The various participants selected may then receive the project information and their corresponding responsibility. In an alternative embodiment of the invention, a new icon may be received in the collaborative software PMA graphical interface, which may open a new collaboration mechanism to include the participants. In one embodiment, the participants may accept the project, review project and managerial information, and review scheduling. If accepted, a button, command, or icon may be selected, authenticating and certifying the confirmation and acceptance.

The project preparation process 200 may next conduct project assessments 260. The project assessment process may begin with the project decision maker scheduling one or more assessment period, and distributing the scheduling to the associated readiness categories. A button, command, or icon may be selected, and the various contributing decision makers' may receive notification of the assessment schedule delegation. The PMA graphical interface appearance and behavior may change to accommodate the new tasks and requirements for each affected decision maker.

At the predetermined time, one embodiment of the invention may open a function processing at least one project assessment transaction for the associated participants. A project assessment may be any assessment within a project, and may be used to determine the amount of a required transaction (task) completed at a specified time. The participating decision makers (participants) may be presented with various managerial and project information, and may be reminded of the categories and readiness ratings. The participants may be required to select one schedule rating of completion from an approved schedule ratings representative of the associated categories readiness. Additionally, they may be asked to provide information, rationale, or justification for their assessment. A deadline for completing an assessment may be enforced in one embodiment of the invention. After each participant makes his or her assessment, an authentication and certification mechanism could be used at this point to record, confirm, and acknowledge assessment.

At the predetermined time, after the appropriate deadlines have passed for participant assessments, the PMA may open an assessment transaction within the various contributing decision makers graphical interface. The contributing decision makers may be presented with additional or altered managerial and project information, and may be reminded of their assigned categories and readiness ratings. In one embodiment of the invention, the contributing decision makers may be presented with reports of all assessments and associated comments form the participants, or all assessments and associated comments assessing their assigned category. The contributing decision makers may each have the option of invoking a collaborative discussion amongst the participants for their specific category. The collaborative discussion mechanism can be invoked between the project decision maker and all the contributing decision makers to review the participants' assessments, to discuss, argue, and persuade. In one embodiment, the contributing decision maker may serve as moderator. Additionally, the contributing decision maker may be required to select one of the approved ratings for readiness, and to provide information, rationale, or justification for their assessment. A deadline for completing an assessment may be enforced by a PMA notification to the project decision maker. After each contributing decision maker makes his or her assessment, an authentication and certification mechanism may be used to record, confirm, and acknowledge assessment.

At the predetermined time, after the appropriate deadlines have passed for all contributing decision maker assessments, the PMA may open an assessment transaction within the project decision makers graphical interface. The project decision maker may be presented with various managerial and project information, and be reminded of the categories and readiness ratings. Additionally, the project decision maker may be presented with reports of the assessments and comments of all the participants and all the contributing decision makers. Further, the project decision maker can have the option of invoking a collaborative discussion amongst all the contributing decision makers. The collaborative discussion mechanism would be invoked to review the contributing decision makers' assessments, to discuss, argue, and persuade. The project decision maker may serve as moderator. Finally, the project decision maker may be required by the PMA to select one of the approved ratings for overall project readiness. He or she may be asked to provide information, rationale, or justification for the assessment. After his or her assessment, an authentication and certification mechanism can be used to record, confirm, and acknowledge assessment.

In another embodiment of the invention, the project decision maker may have tools to perform "what if" analysis on the assessments. This can be useful for determining and documenting how strong the overall group assessment is that the project is or is not ready. Without changing the record of all the individuals' certified assessments, the project decision maker may query questions such as:

What if certain individuals or small groups had made slightly different assessment votes?

What if the pre-agreed vote weighing rules had been slightly different?

After making and recording the group's overall assessment, the project decision maker can make the decision whether to proceed with the project commencement 270, delay the project, reschedule the project, or some other decision. The PMA may open a completion function within the project decision makers graphical interface. Within this function, the project decision maker may be required to select one of the approved ratings for overall project readiness. Again, he or she may be asked to provide information, rationale, or justification for the assessment. After the project decision makers overall assessment has been completed, an authentication and certification mechanism can be used to record, confirm, and acknowledge assessment. For one embodiment of the invention, the decision to reschedule may result in the PMA to again schedule the assessment dates, and the project preparation process 200 may return to the conduct project assessment 260 level before continuing.

If the decision is to proceed, the PMA may permit the project decision maker to manually schedule assessment dates and continue the assessment cycle for any ignored, failed or delayed assessments, and the project preparation process 200 may again return to the conduct project assessment 260 level before continuing.

If the decision is to proceed and no failed or delayed assessments are logged, the PMA may wait a predetermined period, and open a "project preparation completed" 280 transaction within the project decision makers graphical interface. The transaction may contain general project completion information, particularly information about the success of the readiness categories, lessons learned, etc. Additional embodiments of the invention may provide various technical options, such as duration of archiving of project records, distribution of reports, etc. All the project information may be bundled up for archiving, reporting, and pertinent distribution. The "Complete and Close Project" button is selected. A button, command, or icon within the PMA may be selected to signify the completion of the project readiness, and an authentication and certification mechanism could be used to record, confirm, and acknowledge completion.

Figure 3:
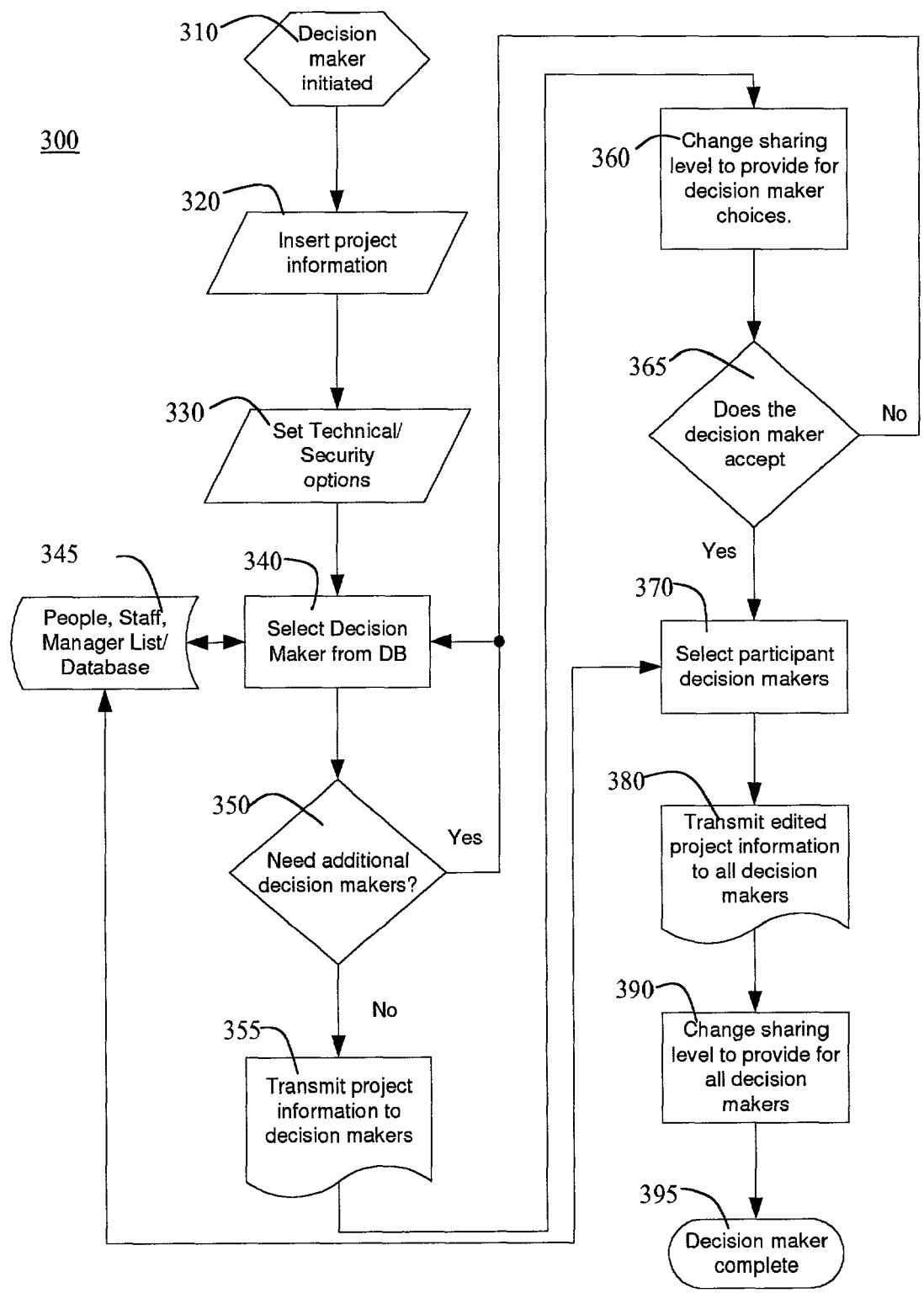
FIG. 3 is a flowchart representation of a preferred embodiment for decision maker choosing within the automated project accountability method of FIG. 2, in accordance with the present invention.

FIG. 3 illustrates a flowchart representation of one embodiment for the decision maker determination 220 of FIG. 2. In this embodiment, the decision maker determination 300 may begin 310 with general project information entered within the PMA 320. Another embodiment of the invention may include entering information about the importance of the project to the enterprise, and a management commitment level illustrating the level of commitment to be taken for a project not to be attempted until readiness is validated. Additionally, various technical options may be set 330, such as frequency of participant notifications and reminders, acceptable periods for participant response and completion of tasks, etc. Additionally, various security options can be selected and set, such as participant authentication methods, distribution and collection of certificates, encryption, and other security settings known in the art.

The decision maker determination 300 may retrieve a list of people, staff, or managers from a database 345 or similar data repository. The list can be presented by the PMA for the selection of a project decision maker 340. In an alternative embodiment, the list may be extracted from collaborative software's address book of all staff, of management team, etc. A further embodiment may automatically choose the best person from the list using preset criteria such as a query cross referencing peoples previous project, education, or management level against general project information and security options. Additionally, the project creator might require additional contributing decision makers 350, from which the project creator, or an automated function, may repeat the selection step 340. Contributing decision makers incorporated here may be people that the project decision maker must incorporate into the validation process.

The chosen project decision maker and contributing decision makers may receive the project information 355 and their corresponding authority within the PMA. In one embodiment of the invention, a new icon may be received on collaborative software desktops, which may open a new dialog for the project decision maker and the contributing decision makers. Each decision maker inspects and reviews the project and managerial information, adds additional comments or commitments for everyone's attention, reviews project template information (such as typical decision categories and readiness ratings) and makes preferred customizations as to how the PMA will behave during this project 360. Each decision maker may in one embodiment, reject their appointment and the decision maker determination 300 returns to select an alternative 340. If the decision maker accepts the project responsibility 365, an authentication and certification mechanism can be used to record, confirm, and acknowledge the acceptance.

The project decision maker and contributing decision makers may require additional participating decision makers (participants) 370 and may either assign known individuals, return to the database loop of 340, or rely on an automated choice mechanism within the PMA. Again, the individuals may accept or decline appointment 365, or another embodiment may require acceptance.

The various decision makers may receive a new icon in the collaborative software desktop, which may open a new dialog in the PMA for the participants to review project and managerial information, add additional comment or commitments for everyone's attention, review project template information (such as typical decision categories and readiness ratings 380. The various decision makers may receive the updated project and corresponding responsibility 390 provided by the PMA 390, completing the decision maker function 395.

The above-described methods and implementation of program management applications are example methods and implementations. The methods, systems, and implementations illustrate one possible approach for automating project accountability. The actual implementation may vary from the method discussed. Moreover, various other improvements and modifications to this invention may occur to those skilled in the art, and those improvements and modifications will fall within the scope of this invention as set forth below.

The present invention may be embodied in other specific forms without departing from its spirit or essential characteristics. The described embodiments are to be considered in all respects only as illustrative and not restrictive.

We claim:

1. A method for automated project accountability comprising:
   determining, by an application server, at least one decision maker of a project preparation;
   determining, by an application server, a readiness category for the decision maker;
   providing, by an application server, a readiness category rating for the readiness category;
   determining, by an application server, a decision process for the readiness category and readiness category rating;
   conducting, by an application server, a project assessment as a function of the decision process; and
   determining, by an application server, a project readiness as a function of the project assessments.

2. The method of claim 1 further comprising: assigning vote weighting to the decision maker.

3. The method of claim 1 further comprising:
   changing a project management application graphical interface, as a function of the project assessment.

4. The method of claim 1 further comprising:
   assigning a time limit in association with the project assessment and the project readiness.

5. The method of claim 1 further comprising:
   providing a collaborative environment for the decision maker.

6. The method of claim 5 wherein the collaborative discussion mechanism is invoked for determining the readiness category, determining the decision process, conducting the project assessment, and determining the project readiness.

7. The method of claim 1 wherein the determination of at least one decision maker further comprises:
   providing project information from a project creator;
   accessing a data repository;
   retrieving a list from the data repository;
   selecting a project decision maker as a function of the project information and list; and
   selecting at least one contributing decision maker as a function of the project information, list, and project decision maker.

8. The method of claim 7 further comprising:
   providing technical information from the project creator; and providing security information from the project creator.

9. A non-transitory computer readable medium storing a computer program comprising:
   computer readable code for determining at least one decision maker of a project preparation;

computer readable code for determining a readiness category for the decision maker;

computer readable code for providing a readiness category rating for the readiness category;

computer readable code for determining a decision process for the readiness category and readiness category rating;

computer readable code for conducting a project assessment as a function of the decision process; and computer readable code for determining a project readiness as a function of the project assessments.

10. The non-transitory computer readable medium of claim 9 further comprising:

means for assigning vote weighting to the decision maker.

11. The non-transitory computer readable medium of claim 9 further comprising:

computer readable code for changing a project management application graphical interface, as a function of the project assessment.

12. The non-transitory computer readable medium of claim 9 further comprising:

computer readable code for assigning a time limit in association with the project assessment and the project readiness.

13. The non-transitory computer readable medium of claim 9 further comprising:

computer readable code for providing a collaborative environment for the decision maker.

14. The non-transitory computer readable medium of claim 9 wherein the computer readable code for determination of at least one decision maker further comprises:

computer readable code for providing project information from a project creator;

computer readable code for accessing a data repository;

computer readable code for retrieving a list from the data repository;

computer readable code for selecting a project decision maker as a function of the project information and list; and computer readable code for selecting at least one contributing decision maker as a function of the project information, list, and project decision maker.

15. The non-transitory computer readable medium of claim 14 further comprising:

computer readable code for providing technical information from the project creator; and computer readable code for providing security information from the project creator.

* * * * *